United States Patent [19]

Hoffman et al.

[11] Patent Number: 5,001,624

[45] Date of Patent: Mar. 19, 1991

[54] PROCESSOR CONTROLLED DMA CONTROLLER FOR TRANSFERRING INSTRUCTION AND DATA FROM MEMORY TO COPROCESSOR

[76] Inventors: Harrell Hoffman, 3509 Greenway, Austin, Tex. 78705; Scott M. Smith, 9211 Mystic Oaks Trail, Austin, Tex. 78750; John A. Voltin, 13001 Broadmeade, Austin, Tex. 78729; Charles G. Wright, 1204 Woodrock, Round Rock, Tex. 78681

[21] Appl. No.: 303,024

[22] Filed: Jan. 25, 1989

Related U.S. Application Data

[63] Continuation of Ser. No. 14,760, Feb. 13, 1987, abandoned.

[51] Int. Cl.⁵ .................... G06F 15/16; G06F 13/38
[52] U.S. Cl. .................................. 364/200; 364/228.6; 364/242.3; 364/260.1; 364/262.9; 364/263
[58] Field of Search ............... 364/200, 900, 131, 132

[56] References Cited

U.S. PATENT DOCUMENTS

| | | | |
|---|---|---|---|
| 3,588,829 | 6/1971 | Boland et al. | 364/200 |
| 3,713,107 | 1/1973 | Barsamian | 364/200 |
| 3,949,379 | 4/1976 | Ball et al. | 364/200 |
| 3,962,706 | 6/1976 | Dennis et al. | 364/200 |
| 4,042,914 | 8/1977 | Curley et al. | 364/200 |
| 4,071,890 | 1/1978 | Pandeya | 364/200 |
| 4,153,932 | 5/1979 | Dennis et al. | 364/200 |
| 4,181,934 | 1/1980 | Marenin | 364/200 |
| 4,370,710 | 1/1983 | Kroft | 364/200 |
| 4,376,976 | 3/1983 | Lahti et al. | 364/200 |
| 4,384,324 | 5/1983 | Kim et al. | 364/200 |
| 4,395,758 | 7/1983 | Helenius et al. | 364/200 |
| 4,451,884 | 5/1984 | Heath et al. | 364/200 |
| 4,481,578 | 11/1984 | Hughes et al. | 364/200 |
| 4,493,051 | 1/1985 | Brezzo et al. | 364/200 |
| 4,509,116 | 4/1985 | Lackey et al. | 364/200 |
| 4,590,556 | 5/1986 | Berger et al. | 364/200 |
| 4,591,975 | 5/1986 | Wade et al. | 364/200 |
| 4,630,195 | 12/1986 | Hester et al. | 364/200 |
| 4,648,034 | 3/1987 | Heninger | 364/200 |
| 4,654,788 | 3/1987 | Bondreau et al. | 364/200 |
| 4,675,806 | 6/1987 | Uchida | 364/200 |
| 4,688,170 | 8/1987 | Waite et al. | 364/200 |
| 4,700,292 | 10/1987 | Campanini | 364/200 |
| 4,729,094 | 3/1988 | Zolnowsky et al. | 364/200 |

FOREIGN PATENT DOCUMENTS 61-223968 10/1986 Japan .

OTHER PUBLICATIONS

"The 801 Minicomputer", by George Radin, pp. 212-221.
"Data-flow IC Makes Short Work of Tough Processing Chores", *Electronic Design*, pp. 191-206.
"A Preliminary Architecture for a Basic Data-Flow Processor", by J. B. Dennis and D. P. Misunas, pp. 126-132.
"A Data Flow Multiprocessor", *IEEE Transactions on Computers*, vol. C-26, No. 2, Feb. 1977, pp. 138-146 (J. Rumbaugh).
"The Piecewise Data Flow Architecture: Architectural Concepts", *IEEE Transactions on Computers*, vol. C-32, No. 5, May 1983, pp. 425-438 (J. Requa/J. McGraw).
"The Control Data 6600", by Thornton (pp. 6-7, 124-141).

*Primary Examiner*—Thomas C. Lee
*Attorney, Agent, or Firm*—Thomas E. Tyson

[57] ABSTRACT

A data processing system including a processor that executes a plurality of instructions including at least one instruction that requires an external operation to be performed. The processor provides information for this external operation instruction to an external device and continues to execute instructions that do not require the results from this external operation. The external device receives the information from the processor, performs the external operation and provides the results to the processor. A further aspect of this data processing system is an interface that is interconnected between the processor and the external device. The processor provides the external operation information to the interface. The interface in turn provides the information to the external device and concurrently accesses data from the memory that will be required by the external device for performing the external operation.

14 Claims, 14 Drawing Sheets

SYSTEM BLOCK DIAGRAM

PROCESSOR INSTRUCTION FORMAT
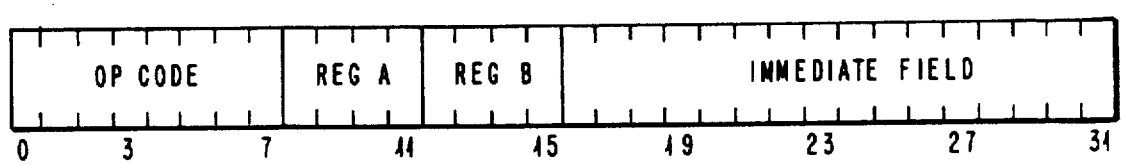
PROCESSOR ADDRESS FORMAT
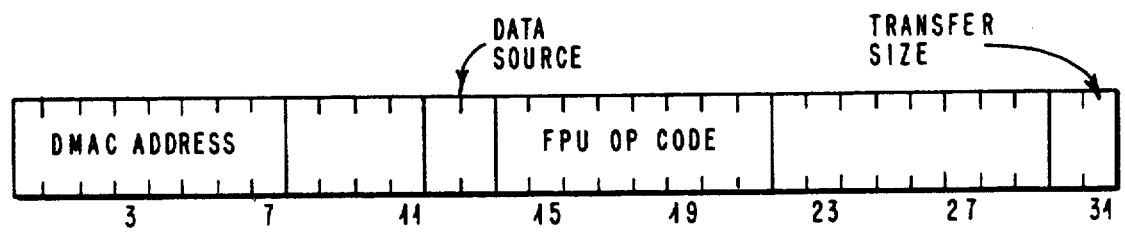
PROCESSOR DATA FORMAT
FIG. 16

| ⌐⌐⌐⌐ | HIGH |
|---|---|
| ——— | LOW |
| HHHHH | HIGH IMPEDANCE |
| <===> | BUS IS VALID |
| REQn | nTH RSC REQUEST |
| REPn | REPLY TO nTH REQUEST |
| +EXCP | +EXCEPTION |
| +DAL | DATA/ADDRESS LINES |
| +DATAGRTI | DATA GRANT IN TO ROMP |

FIG. 18

PROCESSOR CONTROLLED DMA CONTROLLER FOR TRANSFERRING INSTRUCTION AND DATA FROM MEMORY TO COPROCESSOR

This is a continuation of application Ser. No. 07/014,760 filed Feb. 13, 1987, now abandoned.

DESCRIPTION

1. Cross Reference to Related Copending Applications

This patent application is related to the copending patent application Ser. No. 07/014,757 filed Feb. 13, 1987, entitled "Data Processing System With Overlap Bus Cycle Operations" now U.S. Pat. No. 4,817,037.

2. Technical Field

This invention is related to data processing systems and more specifically to data processing systems including a device for performing concurrent operations with operations performed by a processor.

3. Background Art

Data processing systems include processors that communicate with external devices through exclusive hard wired channels (i.e., channels devoted to a peripheral device) or through channels occupied by more than one peripheral device. When a channel is occupied by more than one peripheral device, the processor may use a programmed input/output protocol to communicate with any one device connected on this channel. A programmed input/output (PIO) channel is commonly termed a bus that provides for communications directly from the processor to the peripheral device. A PIO channel traditionally requires the processor to execute PIO instruction that will place an address and data onto the PIO channel. Therefore, the PIO communications will be synchronized with the program execution. Since the operation of this PIO channel requires instruction execution by the processor, communications with the peripheral device may be slower than desired. In addition, the processor resource cannot be used for an independent process while it is providing support for the peripheral device.

A second technique that is commonly used for processor communications is a direct memory access (DMA) channel. DMA channels have traditionally been provided between a processor and a memory to allow faster and independent access to multiple data words resident in memory by the processor. This DMA protocol provides for the transfer of data words without requiring direct step by step supervision by the processor program (unlike the PIO channel). Therefore, the DMA channel is very advantageous for fast mass data transfers.

Two types of control configurations for DMA transfers are the first party DMA and third party DMA configurations. In a first party DMA configuration, the DMA controller is contained in the device performing the DMA transaction. In a third party DMA configuration, the DMA controller is separate from the device performing the DMA transaction. The device conducting the DMA transaction may also be directly connected to a bus connected to the device being accessed or remotely connected through a device that interfaces to a bus connected to the device being accessed. The remote connection is used when the device being accessed and the accessing device have buses that operate at different speeds or have different protocols than the bus connected to the device initiating the DMA transaction.

*IBM Technical Disclosure Bulletin*, Vol. 28, No. 9, February 1986, entitled "Remote Memory Access Interface Between Two Personal Computers" discloses a DMA channel between an IBM PC AT and an IBM PC XT. This disclosure discusses first party and third party DMA operations of the controllers for these two computers.

*IBM Technical Disclosure Bulletin*, Vol. 29, No. 4, September 1986, entitled "Method To Provide Coprocessor Access To System Memory In A Virtual Memory System" and *IBM Technical Disclosure Bulletin*, Vol. 29, No. 4, September 1986, entitled "Shared Direct Memory Access In A Virtual Memory System Having An IO Bus" both disclose a configuration similar to that of the present invention. However, these disclosure bulletins describe first party DMA transactions.

It is an object of the present invention to provide an interconnecting device connected to a processor and memory and an external device that enables the external device to receive commands from the processor in a DMA mode.

It is further the object of the present invention to provide a processor system wherein certain instructions may be concurrently executed by the external device during the execution of instructions in the processor.

It is a further object of the present invention to provide an interface between two buses where the first bus connects a processor and memory and the second bus connects an external device wherein the interface controls information transfer between the two buses and specifically between the devices on these two buses.

DISCLOSURE OF THE INVENTION

In accordance with the present invention a data processing system is provided including a processor that executes a plurality of instructions including at least one instruction requiring an external operation. The processor provides information for this external operation and continues the execution of remaining instructions that do not depend upon the results from the external operation until such results are received. The data processing system also includes an external circuit for performing the external operation upon receiving information from the processing circuit and providing the results to the processor upon the completion of the external operation.

In the preferred embodiment a data processing system is provided including a processor that executes a plurality of instructions including at least one instruction that requires an external operation to be completed by an external device before the execution of the instruction is completed. The processor provides an interface circuit with information from the instruction specifying the external operation. The processor then continues with the execution of the remaining instructions that do not depend upon the results of the external operation. Upon completion of the external operation, the processor continues the execution of all instructions. A memory is provided that stores data for the processor and for the external device and is connected to the processor by a processor bus. The interface circuit is also connected to this processor bus and is further connected to the external device. The interface circuit provides information from the processor instruction to the external device. Concurrently the interface circuit also obtains data that will be required for the performance of this external operation. This data is obtained from the memory over the processor bus and is provided to the external device. The interface then provides the external operation results from the external device to the processor.

A further aspect of the present invention provides for a data processing system including a processor that executes instructions including at least one instruction which requires an external device to complete an operation requiring data from a memory. The data processing system includes the memory that stores information and the external device that performs the specified external operation on the data from the memory. The external device is connected to an interface by a bus. The interface is further connected to a processor bus that interconnects the processor and memory. The protocol and data transfer rate on the two buses are different. The interface provides for translation between the two buses to enable the processor to communicate with the external device and the external device to communicate with both the processor and memory. The interface device further includes circuitry to determine from information provided from the processor to the external device what data will be required from the memory by the external device for the performance of the external operation. The interface then accesses the memory to provide this data to the external device. The interface device further includes the ability to retain information for retrieval by the processor upon the occurrence of an error condition.

BRIEF DESCRIPTION OF THE DRAWING

The novel features believed characteristic of the invention are set forth in the appended claims. The invention itself, however, as well as other features and advantages thereof, will be best understood by reference to the following description of the preferred embodiment, when read in conjunction with the accompanying figures, wherein:

FIG. 16 is a diagram of an instruction executed by the system processor that provides for the performance of an operation by the floating point unit.
FIG. 17 illustrates the symbology used in the timing diagram of FIG. 11.

BEST MODE FOR CARRYING OUT THE INVENTION

Figure 1:
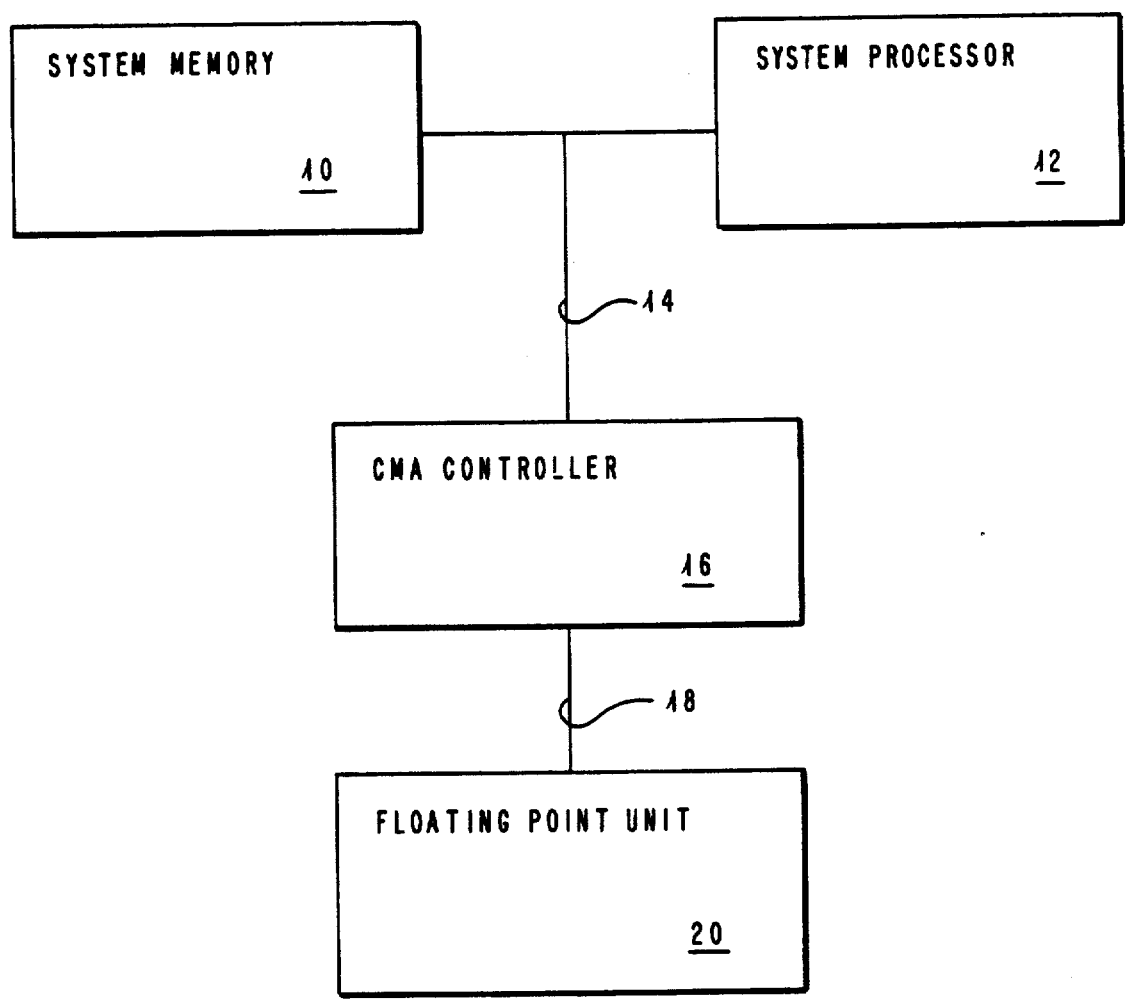
FIG. 1 is a block diagram of a data processing system.

FIG. 1 is a high level block diagram of a data processing system including a system processor 12 and a system memory 10 that are interconnected by a processor bus 14. A DMA controller 16 is further connected to the processor bus 14. A floating point unit 20 is connected to the DMA controller 16 by a DMA bus 18. While in the present embodiment only a single device, floating point unit 20, is connected to bus 18, it should be understood that other devices may also be connected to bus 18.

In the preferred embodiment the system processor 12 is the processor of the IBM RT PC workstation. This system processor 12 is connected to processor bus 14 which is in fact a very high speed bus providing the transfer of 32 bits of information (multiplexed address and data) between the system memory 10 and the system processor 12. The processor bus 14 operates in an inherently decoupled mode allowing overlapping operations, i.e., multiple requests may be issued before replies are received The high speed processor bus 14 may operate in a burst mode up to 40 megabytes per second.

Bus 18 is a lower performance bus when compared to processor bus 14. Bus 18 operates at approximately 5–10 megabytes per second. Furthermore, the protocol of bus 18 is different than that of the processor bus 14 as will be explained. The DMA controller 16 connected to both processor 14 and bus 18 enables the floating point unit 20 to operate with a system processor 12 and system memory 10 in a tightly coupled manner. The system processor 12 when executing instructions will execute a floating point instruction that in fact initiates independent operations of the system memory 10, the DMA controller 16 and the floating point unit 20. In operation the system processor 12 when executing a floating point instruction will provide information from this instruction to the DMA controller 16. The DMA controller 16 decodes this information and provides a portion of this information to the floating point unit 20. Concurrently the DMA controller 16 also accesses data from system memory 10 that will be required by the floating point unit 20 in the performance of the operation specified by instruction from the system processor 12. Meanwhile, the system processor 12 will continue to execute instructions that do not depend upon the result of the operation performed by the floating point unit 20.

Figure 2:
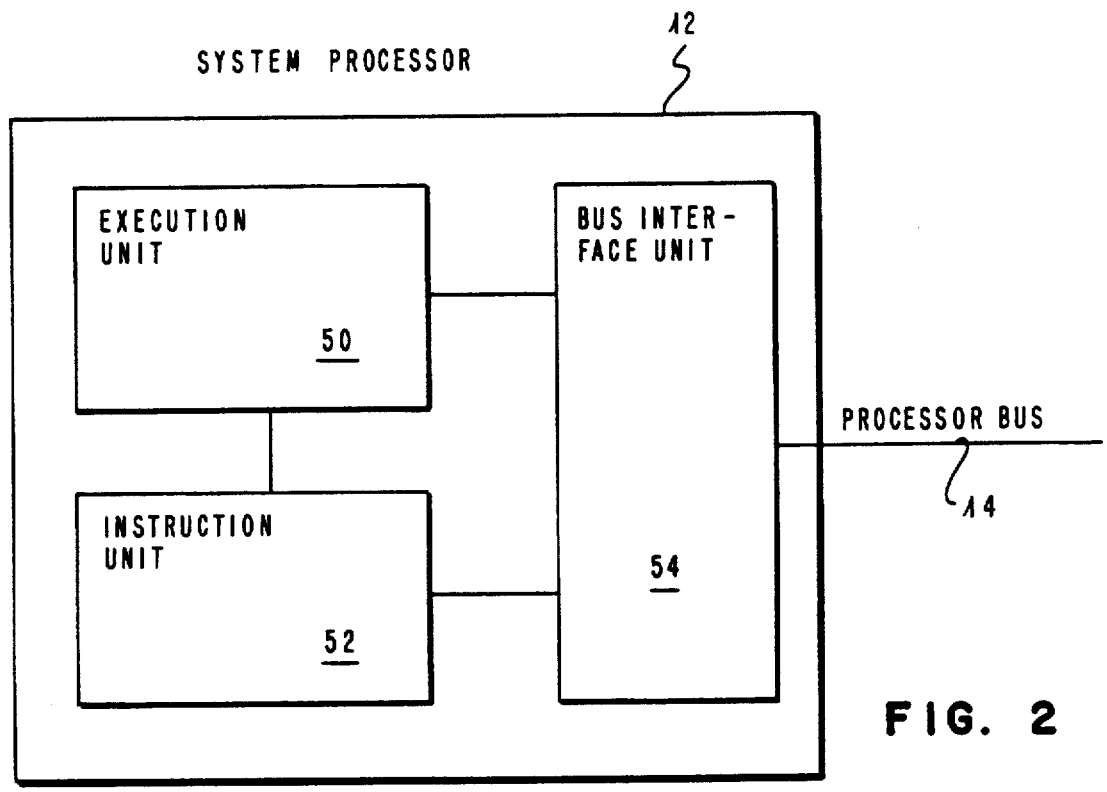
FIG. 2 is a block diagram of a system processor.

FIG. 2 is a block diagram of the system processor 12. In FIG. 2 system processor 12 includes an execution unit 50 connected to an instruction unit 52 both connected to a bus interface unit 54. The bus interface unit 54 is connected to the processor bus 14.

Figure 3:
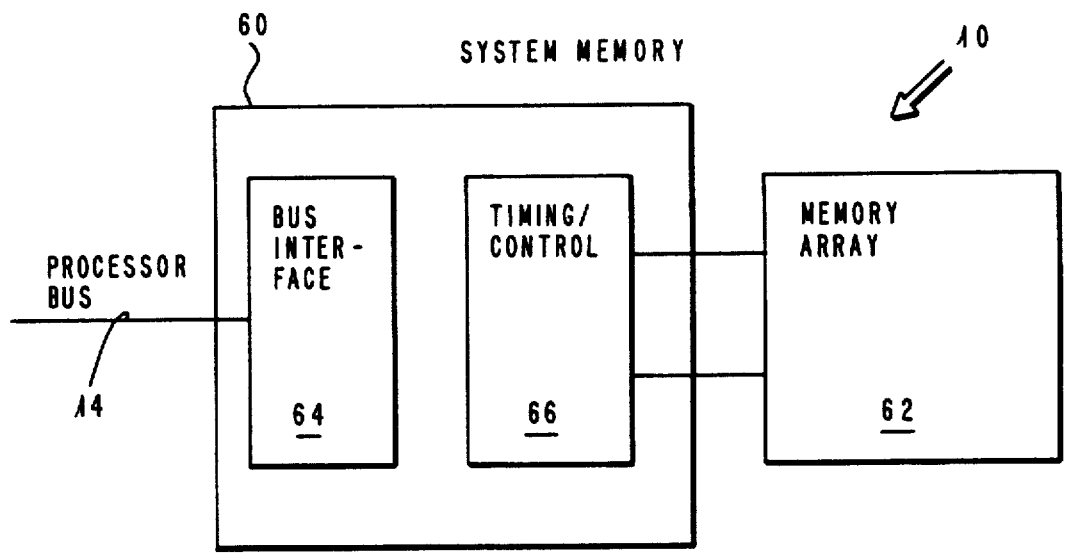
FIG. 3 is a block diagram of a system memory.

FIG. 3 is a block diagram of the system memory 10. Processor bus 14 is connected to a memory controller 60 including a bus interface 64 and a timing and control unit 66. The timing and control unit is connected to a memory array 62 to provide for the storage of information from the processor bus 14.

Figure 4:
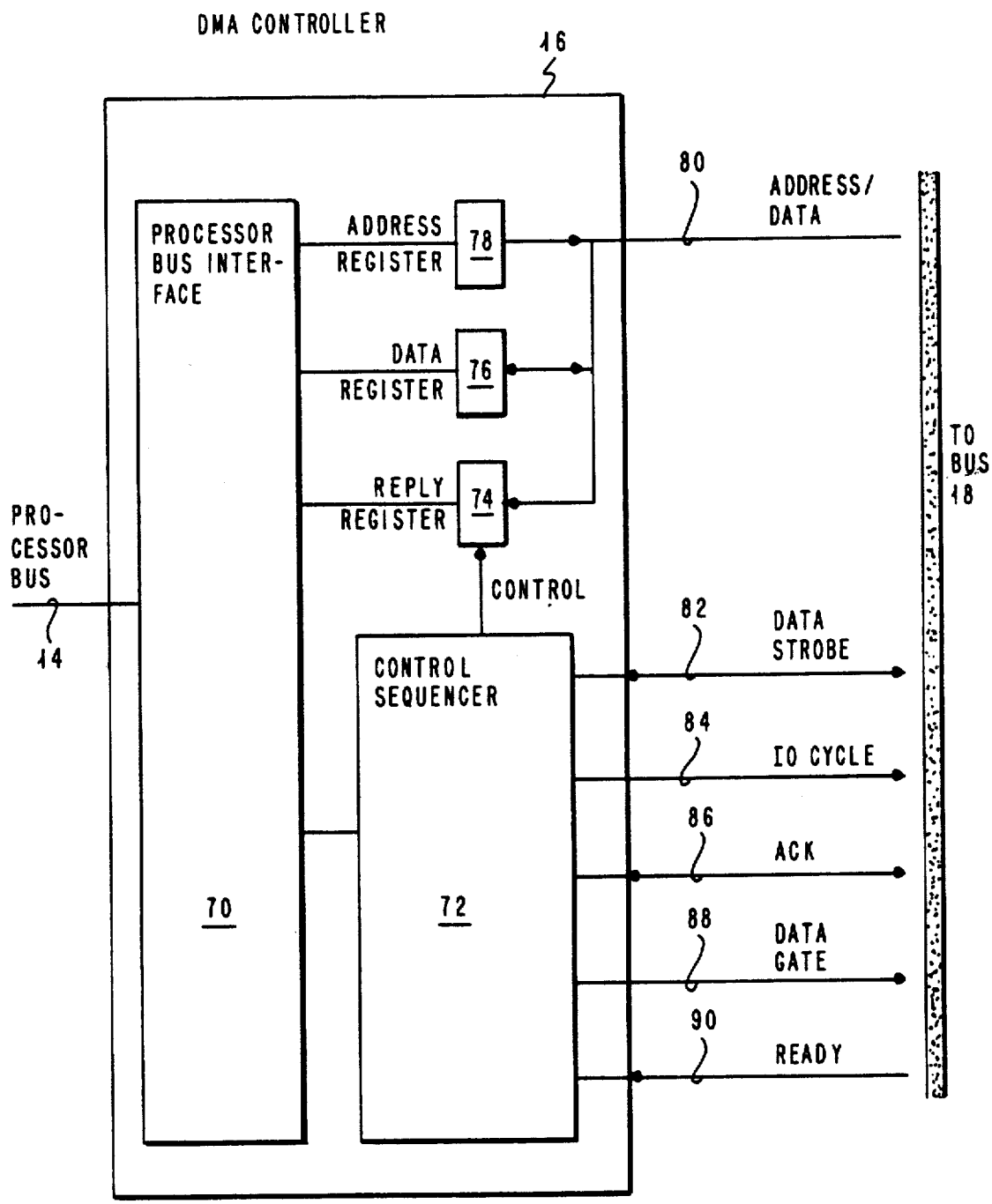
FIG. 4 is a block diagram of a DMA controller.

The DMA controller 16 is illustrated in block diagram form in FIG. 4. THE DMA controller 16 includes a processor bus interface 70 that is connected to processor bus 14. A control sequencer 72 connects to bus 18 to provide five control signals. DMA controller 16 further includes an address register 78, a data register 76, and a reply register 74 that are connected to the processor bus interface 70 and are connected to the address/data lines 80 of bus 18. Register 74 is used for programmed input /outputs and for error recovery. Processor bus interface 70 provides and receives data, addresses and control signals from processor bus 14. The address and data are provided through registers 78 and 76, respectively, to the address/data lines 80 to bus 18 as shown. The control sequencer 72 provides for the control interface to the five control lines 82, 84, 86, 88 and 90 of bus 18. Control sequencer 72 decodes information from processor bus 14 to obtain data from the system memory 10 in support of the floating point unit 20. Control sequencer 72 also supports data transfers from the floating point unit 20 to the system memory 10.

Figure 5:
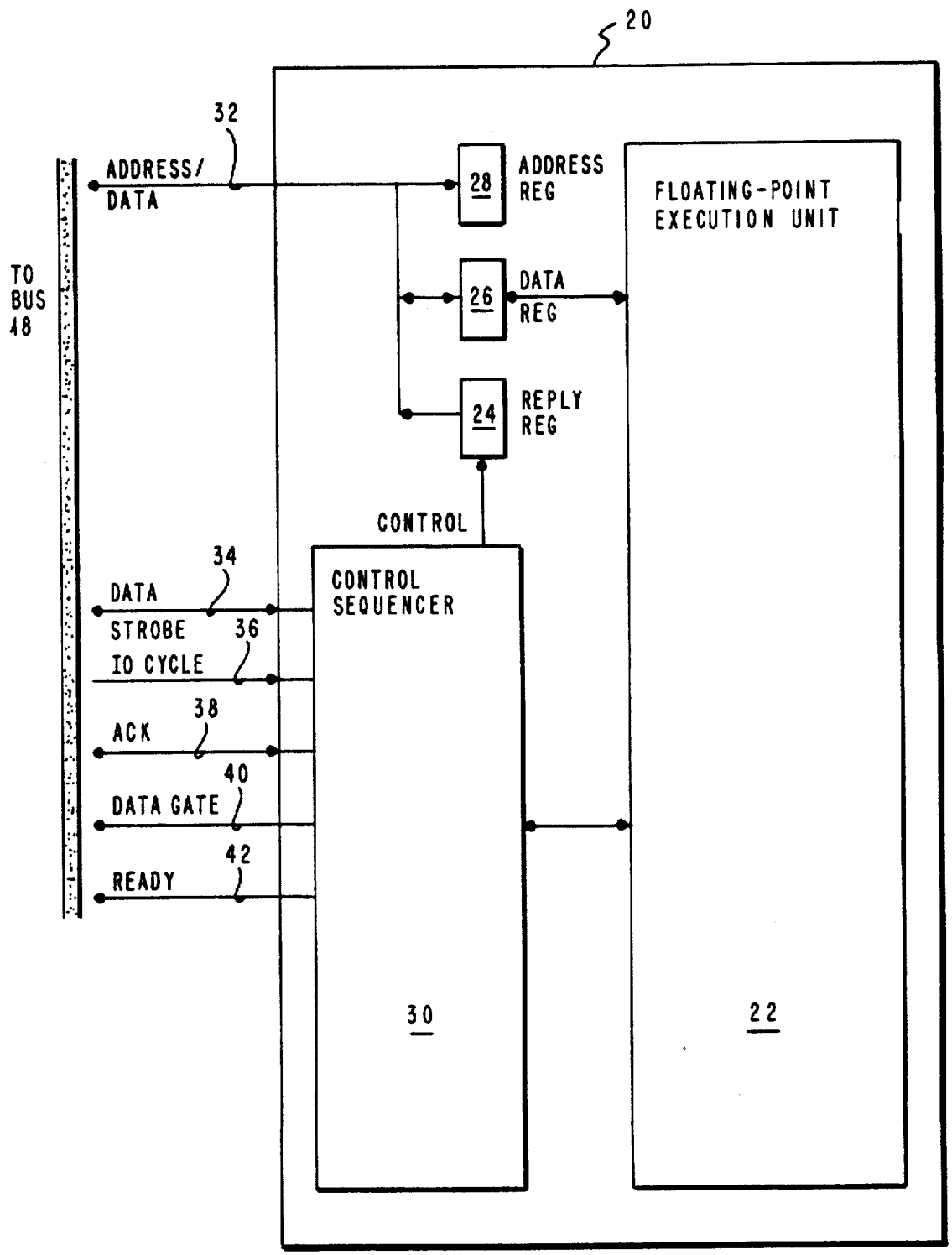
FIG. 5 is a block diagram of a floating point unit.

A block diagram of the floating point unit 20 is illustrated in FIG. 5. The floating point unit 20 is connected to bus 18 and provides and receives address/data information on lines 32. The five control signals from bus 18 are illustrated as lines 34, 36, 38, 40 and 42 connected to a control sequencer 30. The control sequencer is further connected to a reply register 24, data register 26 and address register 28. The reply 24 is used in a manner similar to reply register 74 (FIG. 4). The data register 26 provides information to the floating point execution unit 22. In this preferred embodiment, the floating point execution unit 22 performs floating point operations on the data received from bus 18.

Bus 18

Figure 6A:
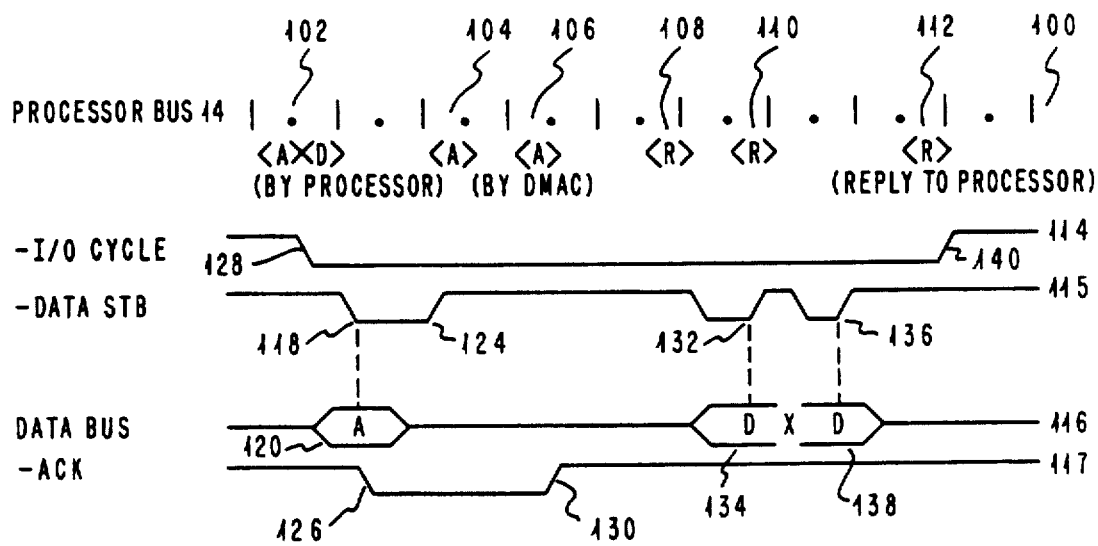
FIG. 6A is a timing diagram for word transfer to the floating point unit.

FIG. 6A is a timing diagram illustrating the timing of processor bus 14 and bus 18. Processor bus 14 is illustrated as a sequence of events on line 100. Processor 18 is illustrated as including an I/O cycle 114, a data strobe 115, a data bus 116, and an acknowledge line 117. The data bus line 116 corresponds to information appearing on address/data bus 80 (FIG. 4) and address/data bus 32 (FIG. 5). The I/O cycle information on line 114 corresponds to the I/O cycle control signal on line 84 (FIG. 4) and line 36 (FIG. 5). Likewise, the data strobe 115 and acknowledge 117 correspond to signals on lines 82 and 86 (FIG. 4) and 34 and 38 (FIG. 5), respectively.

As previously discussed in the preferred embodiment a floating point operation is initiated by system processor 12 by executing an instruction. The contents of this instruction designate an address and data that are provided by system processor 12 to the DMA controller 16 over the processor bus 14. In FIG. 6A this is illustrated in event 102. During event 104, the DMA controller 16 provides a first address to the system memory 10. A second address is provided during time period 106 to the system memory 10. The system memory 10 responds to the two address requests 104 and 106 by providing reply data at times 108 and 110. The DMA controller 16 then responds to the system processor 10 that the DMA controller portion of the instruction has been completed at time 112.

The operation of bus 18 corresponds to the processor bus 14 operation illustrated during time line 100. Specifically, the operation of bus 18 is illustrated by lines 114–117. Upon receiving the address and data (event 102) from the system processor 12, the DMA controller 16 drops the I/O cycle line 114 at time 128. The I/O cycle line 114 like the data strobe and acknowledge lines 115 and 117, respectively, are negative active. When the I/O cycle line 114 is dropped at time 128, the DMA controller 16 is signaling the floating point unit 20 that a bus transfer over bus 18 as being initiated. The data strobe 115 is then dropped at 118 to indicate that an address 120 is present on the data bus line 116. The floating point unit 20 acknowledges the receipt of the data strobe and address by dropping the acknowledge line 117 at time 126. The data strobe line 115 is then raised at time 124. The floating point unit 20 indicates ability to proceed with the operation by raising the acknowledge line 117 at time 130.

The DMA controller 16 also provides the addresses at times 104 and 106 to the system memory 10 on the processor bus 14. When the first data word is received at time 108, the DMA controller 16 then again drops the data strobe line 115 indicating to the floating point unit 20 that a data word 134 is present on the data bus 116. The floating point unit 20 then reads this data at the rising edge 132 of the data strobe line 115. When the second data word from system memory 12 is received at time 110, the data strobe line 115 again is dropped by the DMA controller 116 indicating that data 138 is present on the data bus 116. Again the floating point unit 20 reads data 138 on the rising edge 136 of the data strobe line 115. When the data transfer is complete, the DMA controller 16 then raises the I/O cycle line 114 at time 140 indicating the end of the transfer over bus 18. Likewise, the DMA controller 16 provides a reply to the system processor 12 via the processor bus 14 at time 112 indicating that the data transfer has been completed to the floating point unit. The system processor 12 then will continue the execution of instructions that are not dependent upon the results of this floating point operation which has been initiated in the floating point unit 20.

Figure 6B:
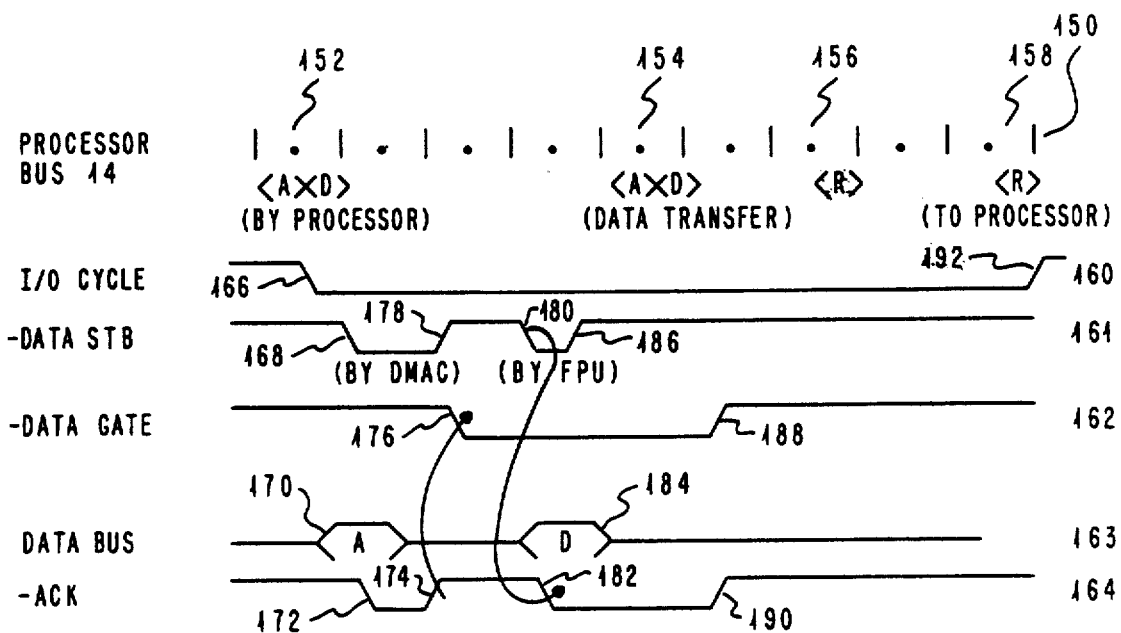
FIG. 6B is a timing diagram for word transfer from the floating point unit.

The system processor 12 is required to initiate the process whereby the results of the floating point operation are transferred from the floating point unit 20 to the system memory 10. To a program executing in the system processor 12, this is accomplished by fetching the data from the floating point unit 20. Since the floating point unit 20 is connected to the DMA controller 16 which is in turn connected to the processor bus 14, this fetching of the floating point results is treated in a similar manner to a memory access. Therefore, the system processor 12 must execute an instruction that causes the data to be transferred to the system memory 10. This operation is illustrated in the timing diagram FIG. 6B.

The system processor 12 provides address and data information at time 152 to the DMA controller 16. At that time the DMA controller initiates a transaction on bus 18 by dropping the I/O cycle line 160 at time 166. The data strobe signal 161 is then dropped at time 168 indicating that address information 170 is available on the data bus 163 to the floating point unit 20. The floating point unit acknowledges the reception of this address information 170 by dropping the acknowledge line 164 at time 172. The floating point unit 20 then raises the acknowledge line 164 at time 174 at which time the DMA controller 116 drops a data gate signal 162 at time 176. Also the DMA controller 116 raises the data strobe line 161 at time 178. The dropping of the data gate line 162 indicates the control of the data strobe as being passed from the DMA controller 16 to the floating point unit 20 and the control of the ACK signal is passed to the DMA controller 16. The floating point unit then takes control of the data strobe line 161 and drops the line at time 180 placing the requested data 184 on data bus 180 or 163. In response to the recognition of the data strobe signal 161, the DMA controller 16 drops the ACK line 164 at time 182 as an indication that more data may not be transmitted until the ACK line 164 is raised (i.e., time 190). The floating point unit 20 then raises the data strobe line 161 at time 186. At this time the DMA controller 16 reads the data 184 from the data bus 186 and provides address and data information 154 to the system memory 10. The DMA controller 16 then raises the data gate line 162 at time 188. The DMA controller 16 holds the ACK line 164 low until after raising the Data Gate line 162 at time 188 to assure that no more data transfers are attempted. The DMA controller 16 receives a reply 156 from the system memory 10 indicating that the data from the floating point unit 20 has been stored. The DMA controller 16 then provides a reply to the system processor 12 on processor bus 14 at time 158. Also the DMA controller 16 then raises the I/O cycle line 160 at time 192 indicating the end of the transaction on bus 18.

The protocol of bus 18 is further discussed in the copending U.S. patent application Ser. No. 014,757, filed Feb. 13, 1987, entitled "Data Processing System With Overlap Bus Cycle Operations" now U.S. Pat. No. 4,817,037.

Processor Bus 14

The processor bus 14 is a high bandwidth synchronous bus designed to interconnect the processor 12, the memory 10 and the DMA controller 16. In the preferred embodiment it supports a 32 bit data transfer and a 24 bit address expandable to 32 bits. Operations on the processor bus 14 consist of two uncoupled transfers, a request and a reply, which allow multiple operations to overlap. This feature, combined with several features in the processor data flow, allow high processor performance with relatively slow storage through interleaving techniques.

The main elements of processor bus 14 are a 32 bit multiplexed data/address bus and a five bit tag bus. The tag bus contains codes which link reply to request. In addition to the data/address bus and tag bus there are several miscellaneous control and clock lines. The processor bus 14 runs synchronously with the processor 10, with two bus cycles per processor cycle. The first bus cycle is always used to transmit addresses and the second is used for data. There are three types of bus transfers:

(1) A read request for one device on the bus is requesting data from another device. A read request consist of a single address cycle. Note that a read request always results in a reply.

(2) A write request where one device on the bus is writing data to another device. A write request consists of an address cycle plus the following data cycle. The write request also results in a reply, this reply being used to report successful completion of the write operation.

(3) A reply where one device is sending data to another device that previously requested a read or write. A reply consists of a single data cycle. In this processor bus 14 architecture, the bus allows any device to assume control of the bus and issue requests.

Control of the processor bus 14 is determined by two arbitration systems, one for request (address grant) and one for replies (data grant). Arbitration is for a period of two bus cycles, with reply and request arbitration being overlapped and timed with each other and also bus transfers. The arbitration system in the present embodiment is defined to be a daisy chain but also can be implemented as a radial arbitrator.

The tag bus is used to identify replies to specific requests. Whenever a request is placed on the processor bus 14, a unique code (a "tag"), which identifies the source of the request, is placed on the tag bus. This tag is used as a return address for a reply generated in response to the request. Tags may also be used for special functions such as channel reset or idle. In the preferred embodiment, the system processor 12 uses 10 tag addresses.

Four control signals are generated in response to transfers on the bus to indicate whether the transfers were successful. These control signals are ACKA, ACKD, NAKA, and NAKD. ACKA and NAKA are responses to the address transfer and occur during the data cycle which immediately follows the address transfer. ACKD and NAKD are responses to the data transfer cycle and occur during the address cycle which immediately follows that data transfer. In the preferred embodiment these lines are negative true signals, and the system processor 12 drives them to a high or inactive level on every other bus cycle. A pullup resistor on each line maintains the line in the inactive level if no bus component is attempting to pull the lines low.

Figure 7:
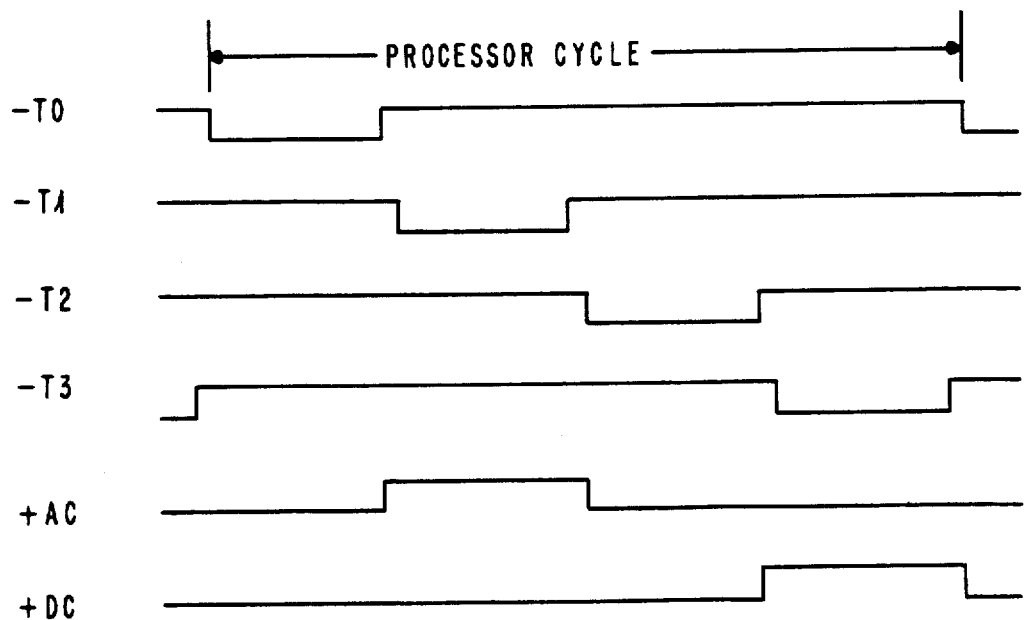
FIG. 7 is a timing circuit for the processor bus clock timing.

FIG. 7 illustrates the timing for processor bus 14. System processor 12 in the preferred embodiment operates with four clocks (-T0, -T1, -T2, -T3) which are generated external to the system processor 12. The system processor 12, the system memory 10 and any other device on the processor bus 14 must use these clocks to control transfess. The trailing edge of T1 (FIG. 7) is used to latch the state for the processor bus 14 for address cycles, while the trailing edge of T3 is used to latch the processor bus 14 for data cycles. In addition, an address clock (+AC) and data clock (+DC) are provided to enable the tristate drivers attached to processor bus 14. The purpose of these clocks is to minimize the possibility of two devices on the bus simultaneously attempting to drive the bus to opposite polarities. AC rises on the trailing edge of T0 and falls at the leading edge T2. DC rises at the trailing edge of T2 and falls on the leading edge of T0.

Figure 8:
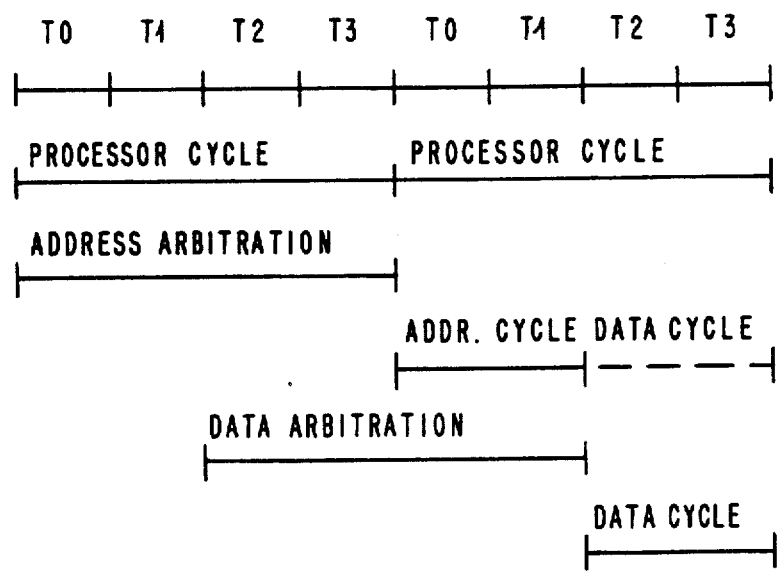
FIG. 8 is a timing diagram for the processor bus arbitration timing sequence.

FIG. 8 illustrates the bus arbitration timing for processor bus 14. The processor bus 14 arbitration includes two linear-priority daisy chains, the address grant chain and the data grant chain. Arbitration on the address chain takes place from the start of T0 to the end of T3 (see FIG. 7). Arbitration on the data grant chain is from the start of T2 to the end of T1 (see FIG. 7). Devices which issue requests participate in address arbitration and devices which issue replies participate in data arbitration.

Figure 9:
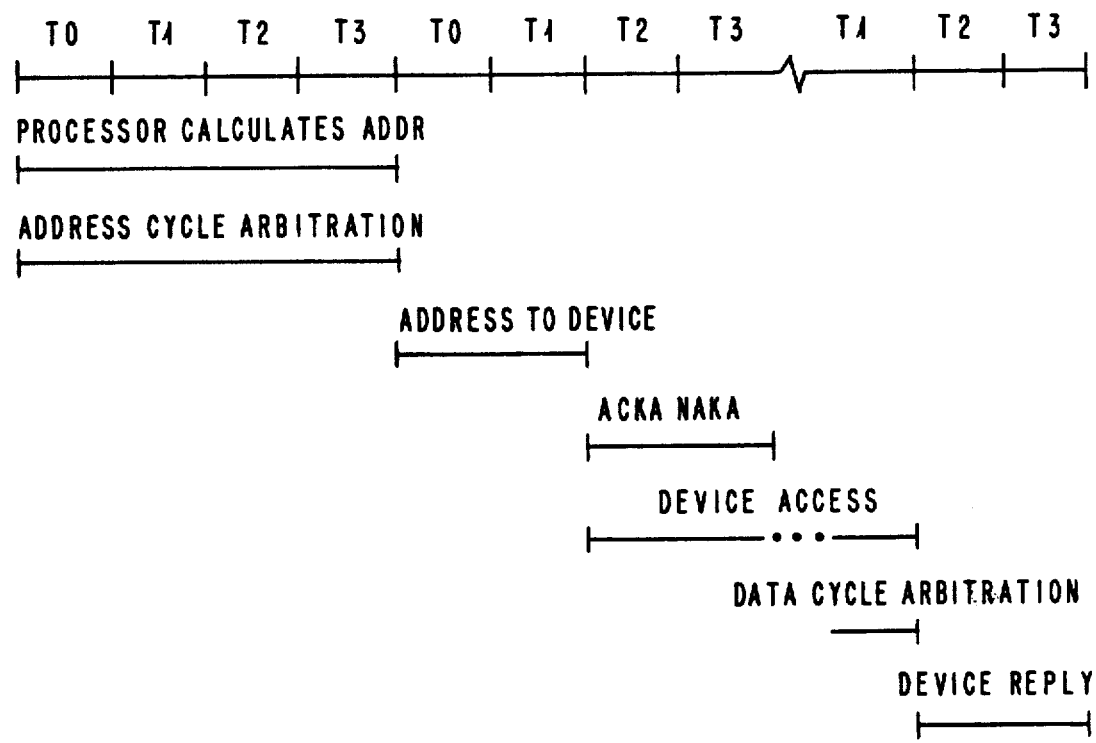
FIG. 9 is a timing diagram for the processor bus read request procedure.

FIG. 9 illustrates a read request in terms of the timing on processor bus 14. A device which reads data from another device will arbitrate for the bus as previously described. At the leading edge of T0 (FIG. 7), the device places the address packet and its TAG ID on the bus. The device may also begin arbitration for the next address cycle if necessary. The requested device would latch the address and the tag on the trailing edge of T1 (FIG. 7). The sending device would then release the address/data bus and the tag bus. The device receiving the TAG ID would then examine the TAG ID to determine whether or not it was a valid request. If it is a valid request, the device would proceed to access the array and to arbitrate for a reply transfer. During T2 and T3, the device would then hold its ACK signal active to indicate that it accepted the read request. If the device was busy or could not accept the request, it would activate the NAKA, and the device sending the request would then have to retry. If the device was to detect a parity error on incoming information, it would activate both the ACKA and NAKA signals. The requesting device may retry the request or signal and error condition. At the leading edge of the next T0 (FIG. 7), the device would release the ACKA and NAKA lines and the system processor 12 would drive it to an inactive level. When the access is complete, an arbitration for a data cycle is successful, the device would then place its reply data on the processor bus 14 address/data lines and would place the TAG ID on the tag lines. The read requesting device would then latch the reply data and the tag and take the appropriate action. The reply would indicate whether the associated request was completed successfully.

Figure 10:
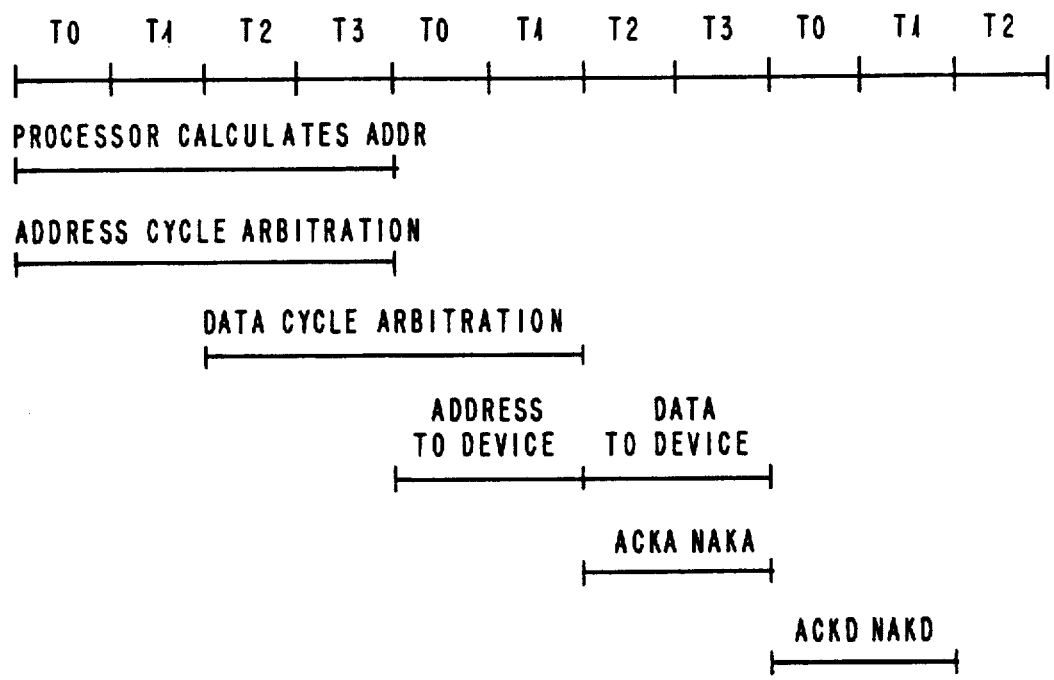
FIG. 10 is a timing diagram for a processor bus write request procedure.

FIG. 10 illustrates the timing for a write request. A write to a storage device such as the system memory 10 requires two bus cycles, the first being an address cycle and the second being the very next data cycle. The device which is to do the write (such as the system processor 12) must arbitrate for the address cycle. If the device has successfully arbitrated for the address cycle and the data cycle is also available, that is, not required for a reply, the write operation can be placed on the bus. During the address cycle the writing device places a write address and length of information on the data/address lines, and its TAG ID on the tag bus. The receiving device (such as system memory 10) will latch the address and tag information at the trailing edge of T1, and respond with an ACKA signal. If the receiving device is busy, it will instead respond with a NAKA signal. In the case of a parity error, the receiving device would activate both the ACKA and NAKA signals. During the data cycle, the writing device places the data on the address/data lines and a special tag which indicates write data on the tag bus. The receiving device would then latch the data on the trailing edge of T3 and check parity on this data. If an error was to be detected, the receiving device would activate the ACKD and NAKD signals indicating that the writing device must retry the transfer If a retry is required, both the address and the data must be retransmitted.

When the write operation is completed, the device processing the request arbitrates for a reply cycle and sends a reply, along with the saved TAG ID, back onto the bus. The reply includes indication of successful completion of the write operation.

The requesting device, upon recognizing its outstanding TAG ID on the Tag Lines, activates the ACKD handshaking line, thus accepting the reply and completing the transaction.

Figure 11:
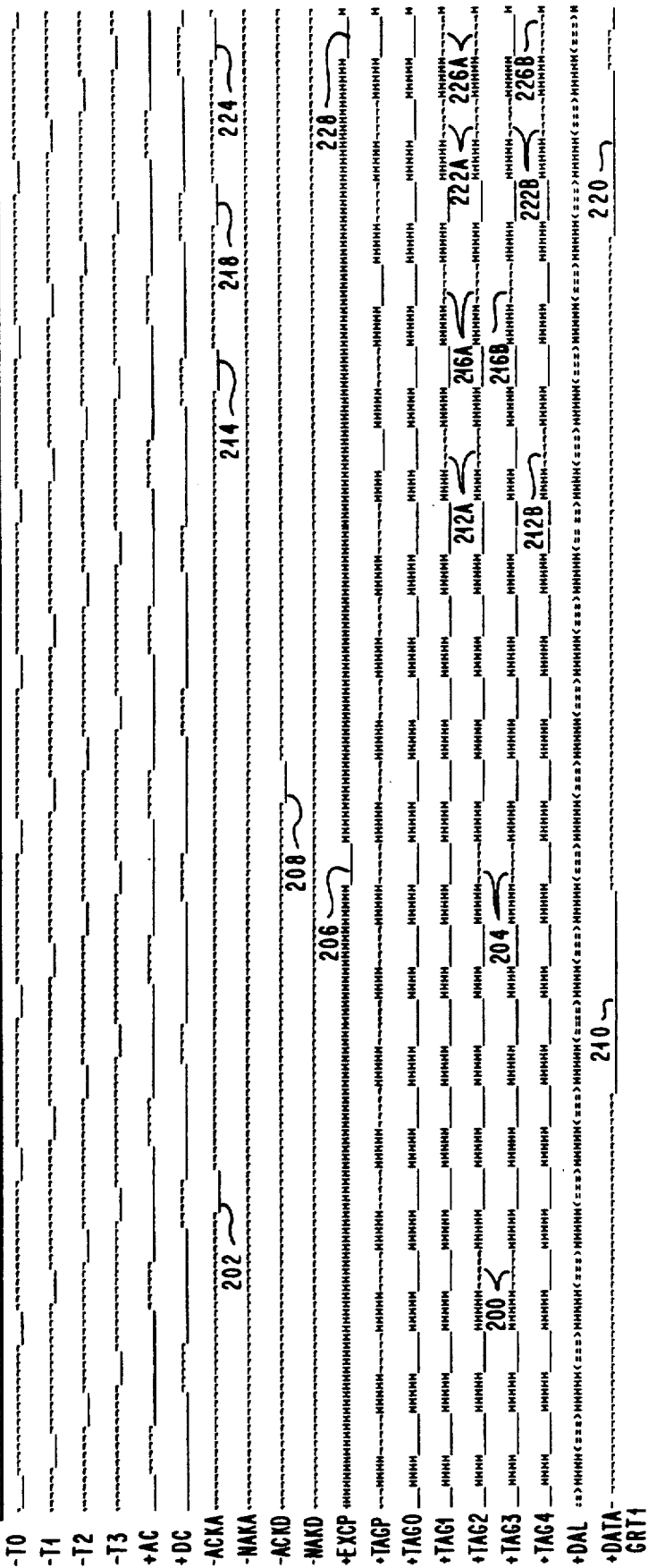
FIG. 11 is a timing diagram illustrating overlap request and responses on the processor bus.
Figure 12:
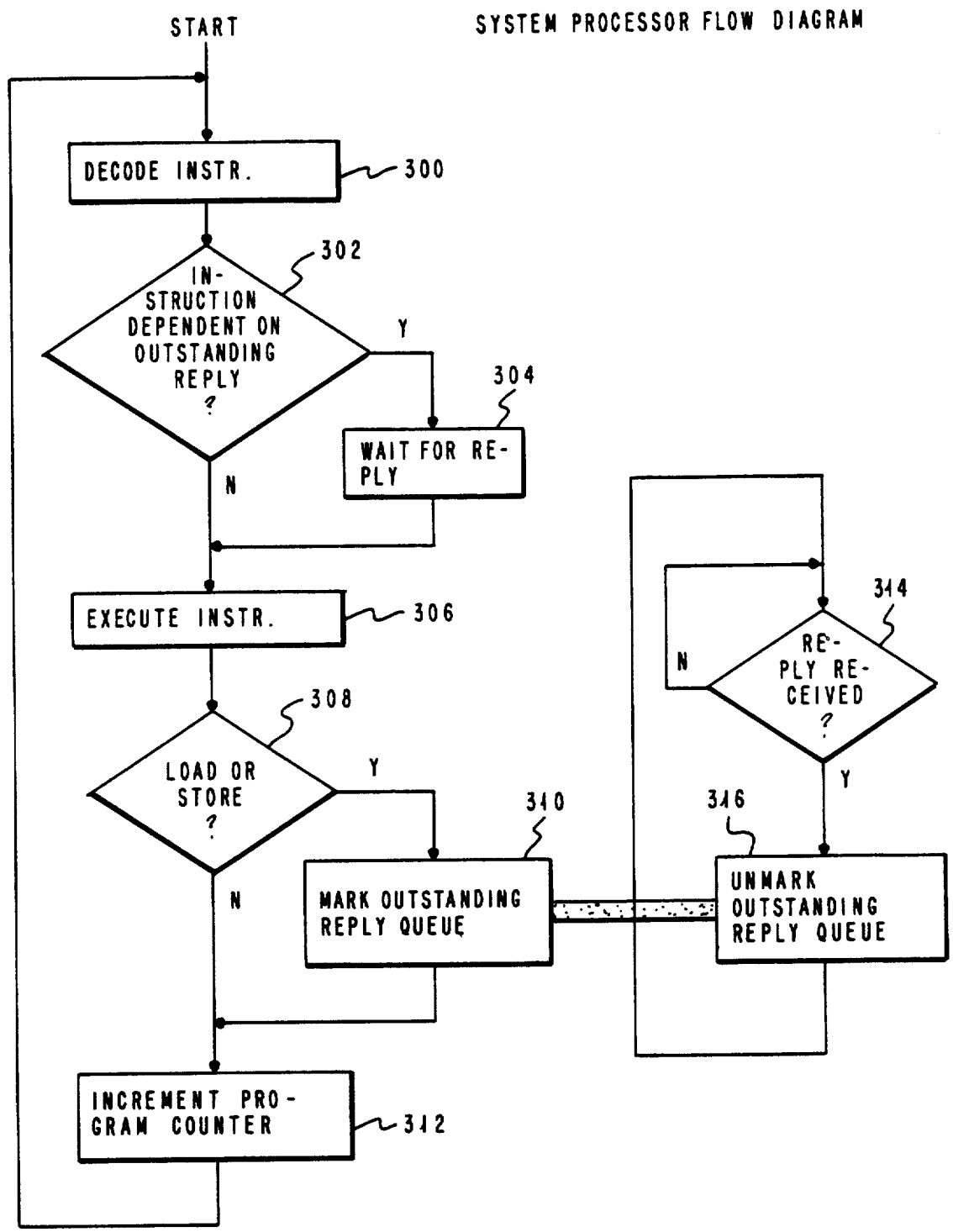
FIG. 12 is a flow chart illustrating the operation of the system processor.

FIG. 11 is a timing diagram illustrating the overlap operations on processor bus 14. FIG. 18 illustrates the symbology used in the timing diagram of FIG. 11. In FIG. 12 a requesting device such as system processor 12 places a request on the processor bus 14 during the second cycle as indicated by the tag addresses 200 (tag 2 and tag 3 being set). At this time data would be placed on the data/address lines (+DAL). The device receiving this read request would then acknowledge by activating the ACKA signal at time 202. In an example where the system processor 12 would be accessing the system memory 10, the system memory would then arbitrate for both the address and data lines. The grant of arbitration as indicated at time 210 preceding the data cycle of cycle 4. The data is placed on the processor 14 with tag 2 and tag 3 set at time 204. The exception line (+EXCP) is set inactive at time 206 indicating that no errors have occurred. The receiving device then acknowledges the receipt of data by dropping the −ACKD signal at time 208.

FIG. 11 also illustrates an overlap operation. Request 2 is sent out during cycle 7. Request 3 and 4 are sent out in following cycles 8 and 9. However, the response or reply to request 2 is sent back during the data cycle portion of cycle 9. Request 2 is sent during the address cycle portion of cycle 7 as indicated by the setting of the tag lines 212A and 212B. This is acknowledge by the receiving device by activating the −ACKA line at time 214. For request 3 the address is sent as indicated by the tag lines 216A and 216B and this address is acknowledge by the receiving device activating the −ACKA signal at time 218. Request 4 is sent out during cycle 9 as indicated by the tag lines 222A and 222B being set. This address is accepted by the receiving device as indicated by the active −ACKA line at time 224. Also, the device replying to request 2 arbitrates for the bus which is granted at time 220. The replying device then sets the tag lines 226A and 226B as shown (which match tag lines 212A and 212B) and provide the data on the data/address lines. Additionally, the exception line is dropped at time 228 to indicate that the transfer occurred without error. As in reply 1, the requesting device should acknowledge by activating the ACKD signal or the NAKD signal.

System Processor Procedure

FIG. 12 illustrates in flow chart form the procedures of the system processor 12 in executing instructions.

In step 300, the system processor 12 decodes the instruction. In step 302, processor 12 determines if the execution of this instruction is dependent upon a response from a previously executed load or store instruction. If so, processor 12 proceeds to step 302 to wait for the reply. If not, processor 12 proceeds to step 306 to execute the instruction. In step 308, processor 12 determines if the instruction is either a load or a store instruction. If so, processor 12 proceeds to step 310 to queue the outstanding reply by recording its TAG ID. In step 312, processor 12 increments the program counter and returns to step 300.

In a parallel process, steps 314 and 316 are executed. In step 314, processor 12 determines if a reply has been received. If not processor 12 loops back to step 314. If a reply is received, processor 12 proceeds to step 316 to record the reception of the TAG ID and to indicate the completion of the load or store instruction.

This procedure is followed in the execution of all instructions. Instructions to the floating point unit 20 are of the "store" type, so that their execution marks the outstanding reply queue. Thus, execution of subsequent instructions may be affected by the completion of the floating point unit 20 operation.

DMA Controller Procedures

Figure 13:
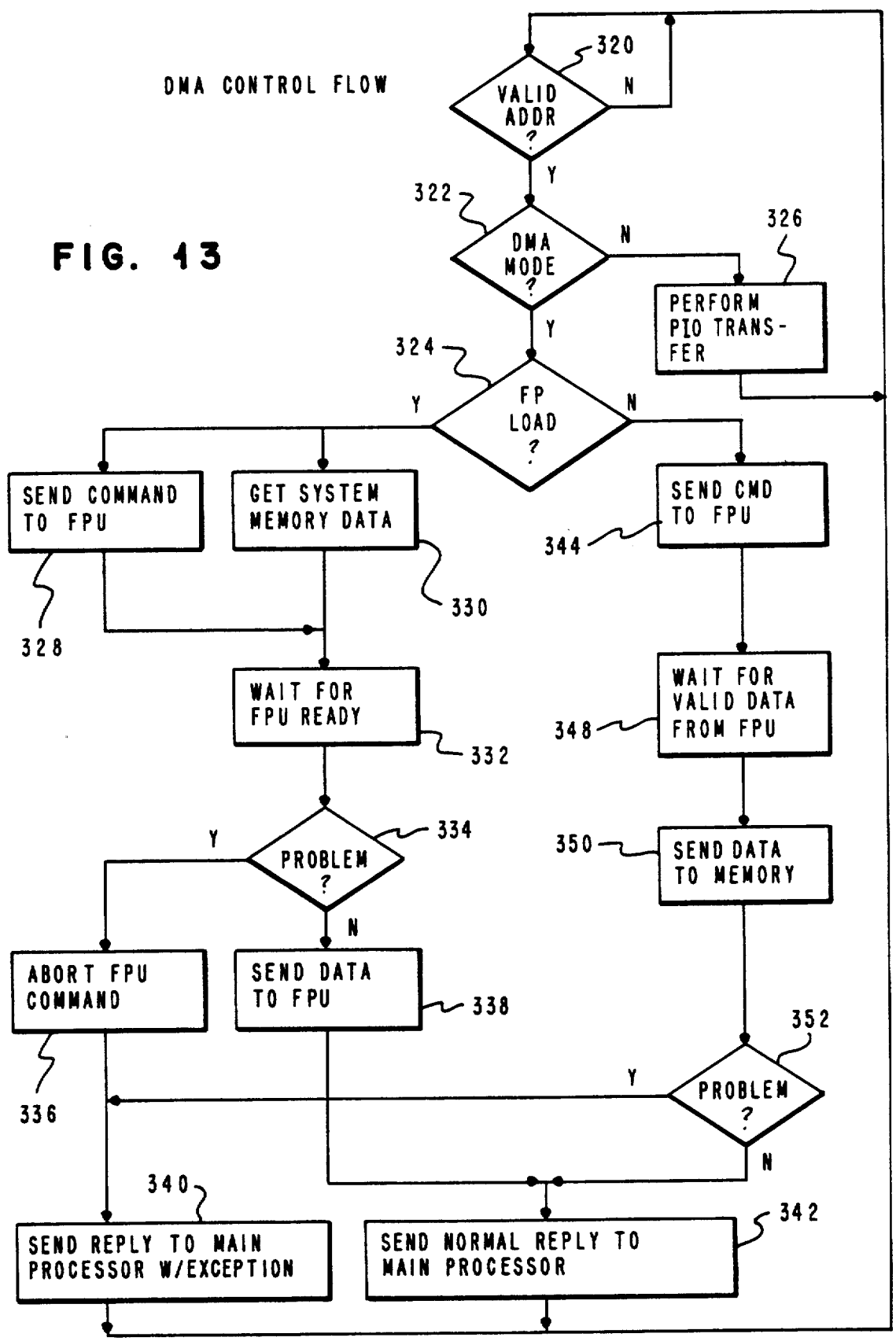
FIG. 13 is a flow chart illustrating the operation of the DMA controller.

FIG. 13 illustrates the procedure executed by the DMA controller during an operation requiring the floating point unit 20. In step 320, the DMA controller 16 determines if the address that it receives over the processor bus 14 is a valid address, i.e., whether the address is intended for the DMA controller 16 or any of its attached devices such as the floating point unit 20. If not, the DMA controller 20 then loops back and waits for a new address to be received. If a valid address is received, controller 16 proceeds to step 322 to determine if the address and data specify a DMA mode of operation. If not, the controller proceeds to step 326 to provide a programmed I/O transfer. The controller 16 would then return to the start to look for additional addresses on processor bus 14. If a DMA mode is specified, controller 16 proceeds to step 324 to determine if the operation is a floating point operation requiring information to be loaded to the floating point unit 20. If not, the controller 16 proceeds to step 344 to send the command to the floating point unit 20 (time 168, FIG. 6B). This command would be requesting data from the floating point unit 20. The DMA controller 16 would proceed to step 348 to wait for the data from the floating point unit 20 (time 176, FIG. 6B). When the data is received, the controller 16 would proceed to step 350 to send the data to the system memory 10 (time 154, FIG. 6B). The controller would proceed to step 352 to determine if a problem exist. This problem may exist either from the floating point unit 20 or from sending the data to the system memory 10. If a problem does exist, the controller 16 would proceed to step 340 to send a reply on processor bus 14 to processor 12 indicating an exception has occurred. If no problem, controller 16 would then proceed to step 342 to send a normal reply to processor 12 over the processor bus 14 (time 156, FIG. 6B).

Returning to step 324, if the instruction is going to require data to be loaded into the floating point unit 20, the controller 16 proceeds to execute two procedures concurrently. In step 328, the controller would send the command to the floating point unit 20 over bus 18 (time 118, FIG. 6A). In step 330 the controller 16 would send the request for data to the system memory 10 over the processor bus 14 (time 104, FIG. 6A). Upon receiving the data from the system memory 10 over the processor bus 14, the controller 16 proceeds to step 332 to wait for a ready response from the floating point unit 20 (time 130, FIG. 6A). In step 334, the controller 16 determines if a problem has occurred Such a problem would have occurred if the system memory 10 or the floating point unit 20 would indicate that an error condition has occurred by sending an exception with its respective response or by not responding within a specified time period. If such an error condition does occur, the controller 16 proceeds to step 336 to abort the floating point unit command by sending an abort command to the floating point unit 20 over bus 18 and then proceeds to step 340 to send the exception response to processor 12 over processor bus 14. If no problem has occurred in step 334, the data is sent to the floating point unit 20 in step 338 and a normal reply is then sent to processor 12 over processor bus 14 in step 342 (time 102, FIG. 6A). At the completion of either steps 340 or 342, controller 16 returns to look for addresses on the processor bus 14.

System Memory Procedure

Figure 14:
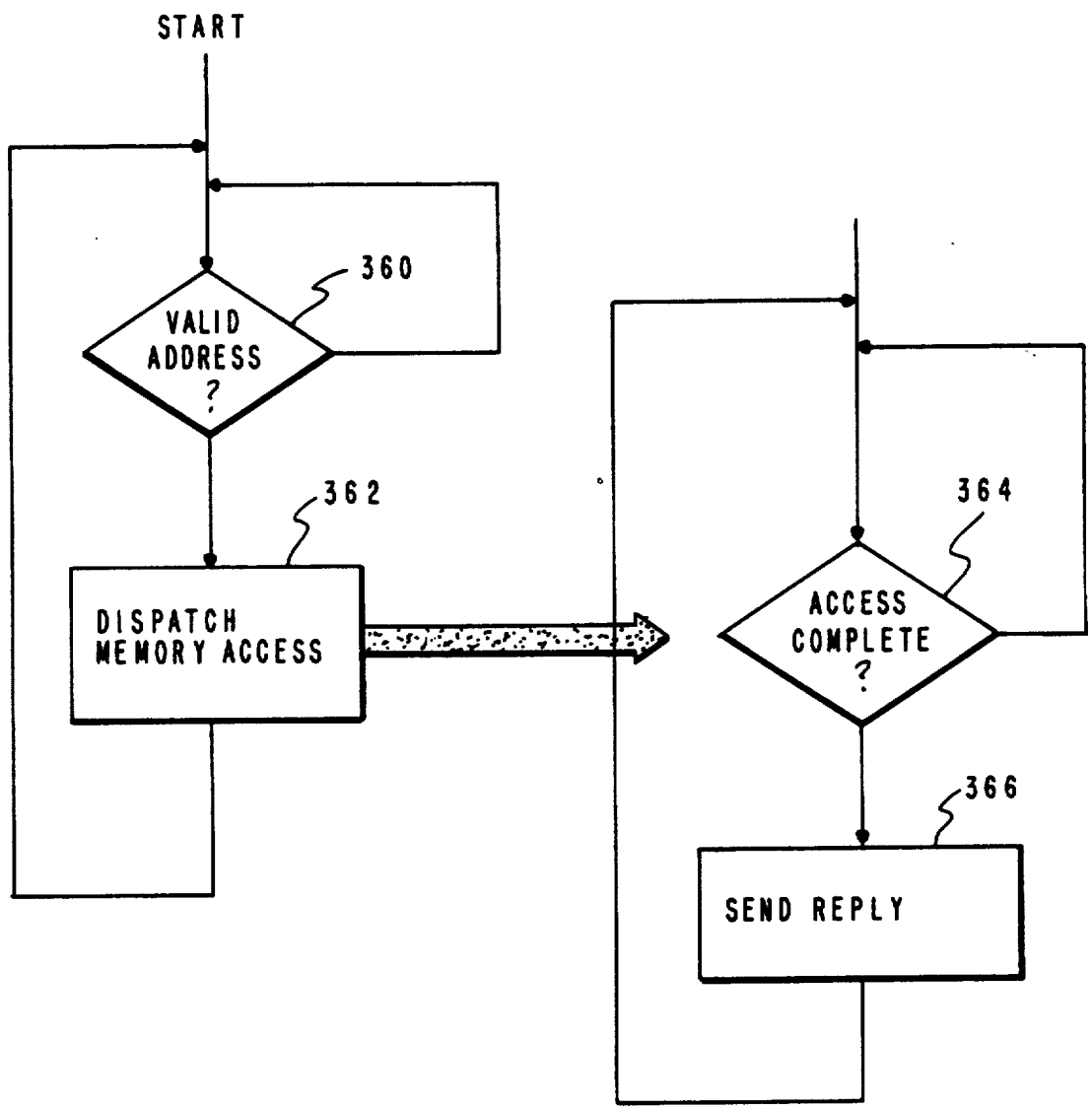
FIG. 14 is a flow chart illustrating the operation of the system memory.

FIG. 14 illustrates the procedure executed by system memory 10. In step 360, the memory determines if a valid address has been received on processor bus 14, i.e., if the system memory 10 is being addressed. If an address is received, the memory 10 proceeds to step 362 to dispatch a memory access to the memory array and then returns to examine addresses on the processor bus 14. When the address is complete (step 364), memory 10 proceeds to send a response in step 366 to the DMA controller 16. The system memory procedure is performed by the bus interface 64 and timing/control 66 units illustrated in FIG. 3.

Floating Point Unit Procedure

Figure 15:
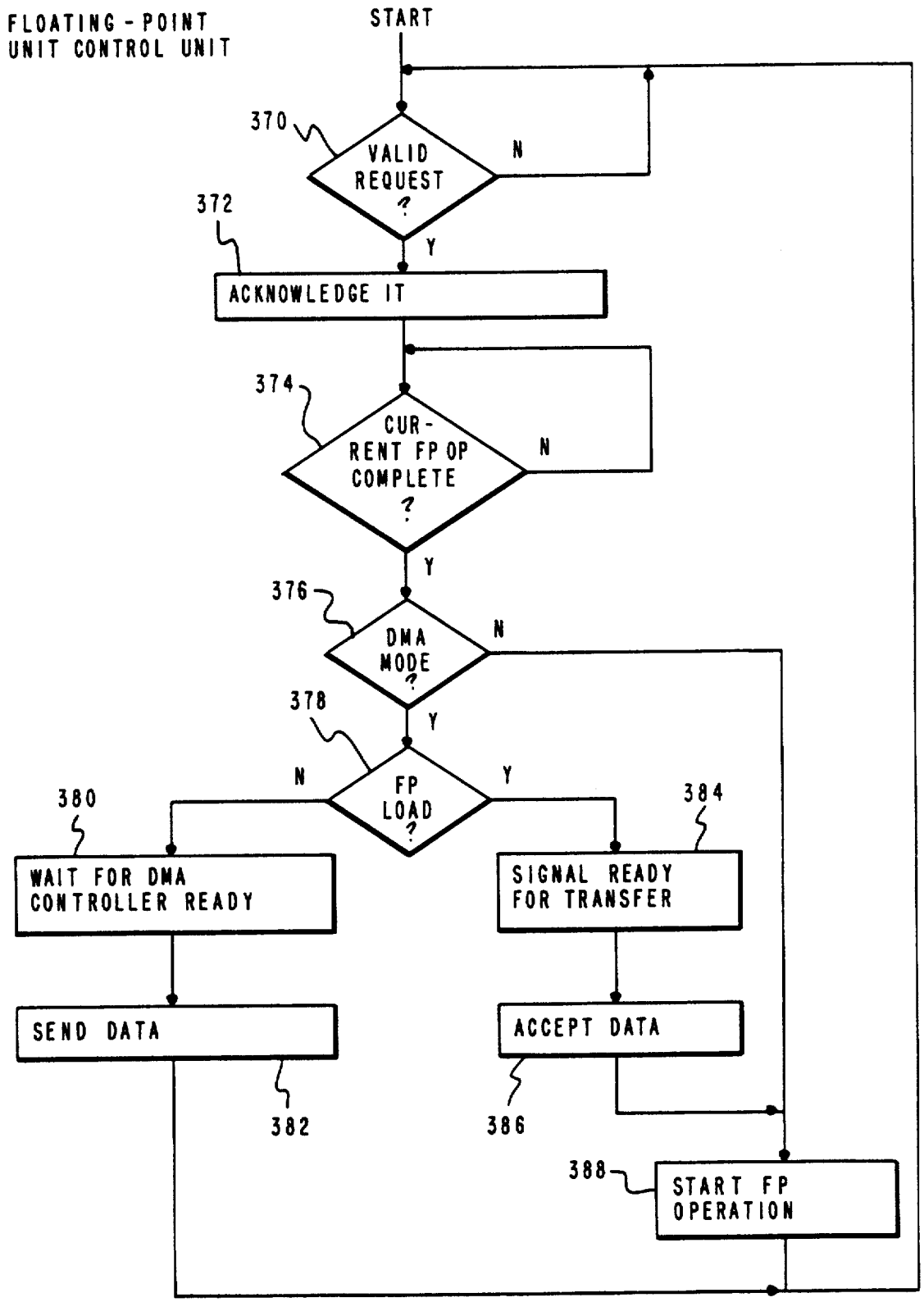
FIG. 15 is a flow chart illustrating the operation of the floating point unit.

FIG. 15 illustrates the procedure executed in the floating point unit 20. The floating point unit is examining bus 18 for a valid address in step 370. Upon receiving a valid address, the floating point unit 20 will acknowledge the transfer in step 372. In step 374 the floating point unit 20 determines if the current floating point operation is complete. If not, the floating point unit 20 then loops back until such operation is complete. If the current operation has been completed, the floating point unit 20 proceeds to step 376 to determine if the command from bus 18 is a DMA command. If not, the floating point unit 20 proceeds to step 388 to start a floating point operation upon the information received. Upon the completion of this operation, the floating point unit 20 then returns to the start.

Returning to step 376, if a DMA mode is specified, the floating point unit 20 proceeds to step 378 to determine if a data load has been requested. If no data load has not been requested, the floating point unit 20 proceeds to step 380. If the floating point unit reaches step 380, then the command that has been received is requesting data. The floating point unit must then wait for a ready signal from the DMA controller 16 in step 380. Upon receiving the ready signal, the floating point unit 20 will send the data requested in step 382 and return to the start position.

Returning to step 378, if a data load has been requested, the floating point unit 20 proceeds to step 384 to signal the DMA controller 16 that it is ready for the data transfer. When the data is sent from the DMA controller 16 over bus 18, the floating point unit accepts the data in step 386. The floating point unit 10 then proceeds to step 388 to perform the specified floating point operation and then returns to the start position.

Processor Instruction Format

FIG. 16 illustrates the formats for the instruction address and data for performing a floating point operation. The system processor 12 would receive the instruction including an OP code together with specifications of a register A, a register B and an immediate field. In the preferred embodiment, this is a store instruction with the address being specified by the contents of register B plus the immediate field and the data being specified by the contents of register A. Processor 12 would then place the address and data words onto the processor bus 14. The address as illustrated includes the first eight bits that designate the DMA controller 16 as the receiving device. This address further includes the floating point unit 20 operation code. Bits 30 and 31 of the address also specify the number of words that are to be transferred to or from the system memory 10. Bits 12 and 13 are decoded by the DMA controller 16 to determine which direction data is to be transferred. The FPU OP code is then decoded by the floating point unit 20 to determine which floating point operation is to be performed. The data word on processor bus 14 is actually the memory address that the DMA controller 16 is to use to access the number of data words specified by the transfer size. These data words are then sent to or from the floating point unit 20 as previously described.

The embodiment of this invention is described in the "IBM RT PC Hardware Technical Reference Manual" which is herein incorporated by reference.

Although this invention has been described with reference to this specific embodiment, this description is not meant to be construed in a limiting sense. Various modifications of the disclosed embodiment, as well as other embodiments of the invention, will become apparent to those persons skilled in the art upon reference to the description of this invention. It is, therefore, contemplated that the appended claims will cover any such modifications or embodiments as fall within the true scope of this invention.

What is claimed is:

1. A data processing system comprising:

a processor means for executing each instruction in a sequence of instructions in accordance with its order of occurrence in said sequence, said sequence including at least one instruction requiring a computational operation to be completed by an external device mans before the execution of said instruction is completed, said processor means including means for providing an interface means with information from said external device instruction and continuing the execution of remaining instructions that do not depend upon completion of the external device means operation until an instruction of the sequence is encountered that depends upon the completion of the external device means operation wherein the execution of remaining instructions is delayed until an indication of the completion of the external device means operation is received;

a memory means for storing data for said processor means and said external device means and connected to said processor means via a memory channel;

said external device means connected to said interface means for receiving instruction data from said interface means, performing said computational operation and providing an indication upon completion of said operation; and said interface means connected to said memory channel for receiving said information from said processor means, providing data requests to said memory means in response to the received information, receiving said data from said memory means, providing said instruction data to said external device means based upon said received information and said memory means data, receiving said completion indication from said external device means and providing said completion indication to said processor means.

2. A data processing system according to claim 1 wherein said interface means includes means for retrieving from said memory means operation data required by said external means for completion of said operation.

3. A data processing system according to claim 2 wherein said interface retrieval means includes means for concurrently retrieving data from said memory means while providing said operation data to said external means.

4. A data processing system according to claim 3 wherein said interface means is connected to a first bus interconnecting said memory means and said processor means and to a second bus interconnecting to said external device means.

5. A data processing system according to claim 4 wherein said first and second buses include different bus protocols.

6. A data processing system according to claim 5 wherein said interface means provides protocol translation between said first and second buses for providing information between said processor means, memory means and external device means.

7. A data processing system according to claim 6 wherein said first and second buses provide different data transfer rates.

8. A data processing system according to claim 7 wherein said interface means includes means for retaining information for retrieval by said processor means upon an occurrence of an error condition.

9. A data processing system comprising:

a processor means for executing instructions including at least one instruction which requires an external means to complete a computational operation requiring data from a memory means and including means for providing an interface means with information from said external means instruction;

said memory means for storing data;

said external means for performing said computational operation on said data from the memory means and providing an indication upon the completion of said computational operation; and said interface means connected between the external means and the processor means and the memory means for receiving said information and providing operation information to the external means concurrently with obtaining data from the memory means for the performance of said computational operation and said interface means including means for providing said data from said memory means to said external means.

10. A data processing system according to claim 9 wherein said interface means is connected to a first bus interconnecting said memory means and said processor means and to a second bus interconnecting to said external device means.

11. A data processing system according to claim 10 wherein said first and second buses include different bus protocols.

12. A data processing system according to claim 11 wherein said interface means provides protocol translation between said first and second buses for providing information between said processor means, memory means and external device means.

13. A data processing system according to claim 12 wherein said first and second buses provide different data transfer rates.

14. A data processing system according to claim 13 wherein said interface means includes means for retaining information for retrieval by said processor means upon an occurrence of an error condition.

* * * * *

UNITED STATES PATENT AND TRADEMARK OFFICE
CERTIFICATE OF CORRECTION

PATENT NO. : 5,001,624
DATED : March 19, 1991
INVENTOR(S) : Harrell Hoffman, Scott M. Smith, John A. Voltin and Charles G. Wright It is certified that error appears in the above–identified patent and that said Letters Patent is hereby corrected as shown below:

Col. 13, line 18, please delete "mans" and insert --means--.

Signed and Sealed this

Twentieth Day of July, 1993

Attest:

MICHAEL K. KIRK

Attesting Officer

Acting Commissioner of Patents and Trademarks